US010249404B2

(12) United States Patent
Park et al.

(10) Patent No.: US 10,249,404 B2
(45) Date of Patent: Apr. 2, 2019

(54) CERAMIC PASTE COMPOSITION USING CARBON NANOTUBE OR CARBON NANOTUBE-METAL COMPLEX, AND CONDUCTIVE FILM CONTAINING SAME

(71) Applicant: BIONEER CORPORATION, Daejeon (KR)

(72) Inventors: Han Oh Park, Daejeon (KR); Jae Ha Kim, Daejeon (KR); Jun Pyo Kim, Cheongju-si (KR)

(73) Assignee: BIONEER CORPORATION, Daejeon (KR)

( * ) Notice: Subject to any disclaimer, the term of this patent is extended or adjusted under 35 U.S.C. 154(b) by 0 days.

(21) Appl. No.: 14/904,358

(22) PCT Filed: Jul. 9, 2014

(86) PCT No.: PCT/KR2014/006141
§ 371 (c)(1),
(2) Date: Jan. 11, 2016

(87) PCT Pub. No.: WO2015/005665
PCT Pub. Date: Jan. 15, 2015

(65) Prior Publication Data
US 2016/0254072 A1    Sep. 1, 2016

(30) Foreign Application Priority Data

Jul. 12, 2013  (KR) .................. 10-2013-0082105

(51) Int. Cl.
*H01B 1/24*   (2006.01)
*C04B 35/52*  (2006.01)
(Continued)

(52) U.S. Cl.
CPC .............. *H01B 1/24* (2013.01); *C04B 35/52* (2013.01); *H01B 1/04* (2013.01); *H01B 1/18* (2013.01)

(58) Field of Classification Search
CPC .... H01B 1/24; H01B 1/04; H01B 1/18; C04B 35/52; C04B 35/80
(Continued)

(56) References Cited

U.S. PATENT DOCUMENTS 8,206,831 B2   6/2012  Aoki
8,637,122 B2   1/2014  Lee et al.
(Continued)

FOREIGN PATENT DOCUMENTS

CN    101735561    6/2010
CN    102046517    5/2011
(Continued)

OTHER PUBLICATIONS

International Search Report for corresponding International PCT Application No. PCT/KR2014/006141, dated Aug. 21, 2014.

*Primary Examiner* — Harold Y Pyon
*Assistant Examiner* — Danny N Kang
(74) *Attorney, Agent, or Firm* — Hauptman Ham, LLP

(57) ABSTRACT

A ceramic paste composition including carbon nanotubes or a carbon nanotube-metal composite and a silicone adhesive, wherein the silicone adhesive includes 0.1 to 10 wt % of a silanol group, and has a mole ratio of a phenyl group to a methyl group of 0.3 to 2.5. The ceramic paste composition has low sheet resistance, through which an excellent heat generating property, and shielding, absorbing and conducting properties may be implemented in one or more embodiments. Further, though the ceramic paste composition has a very high heat generating temperature of 400° C., as compared with general paste based on carbon nanotubes, the
(Continued)

physical properties thereof may be maintained stably. In addition, the ceramic paste may be widely used in various fields including heat generating products such as those for keeping warmth or heating, and products for electromagnetic wave shielding and absorption, electrodes, electronic circuits, antennas, and the like.

6 Claims, 2 Drawing Sheets

(51) Int. Cl.
 *H01B 1/04* (2006.01)
 *H01B 1/18* (2006.01)
(58) Field of Classification Search
 USPC .......................................................... 252/500
 See application file for complete search history.

(56) References Cited

U.S. PATENT DOCUMENTS

| 2003/0146538 | A1* | 8/2003 | Sambrook | ........... | C04B 38/0655 |
| | | | | | 264/211 |
| 2006/0025515 | A1* | 2/2006 | Scaringe | ................ | B82Y 30/00 |
| | | | | | 524/496 |
| 2008/0286559 | A1 | 11/2008 | Lee et al. | | |
| 2009/0305036 | A1 | 12/2009 | Aoki | | |
| 2010/0193961 | A1* | 8/2010 | Konishi | .................. | C08L 63/00 |
| | | | | | 257/773 |
| 2013/0101835 | A1 | 4/2013 | Park et al. | | |

FOREIGN PATENT DOCUMENTS

| JP | 2002138204 | 5/2002 |
| JP | 2007238868 | 9/2007 |
| JP | 2009275214 | 11/2009 |
| JP | 2010-13632 A | 1/2010 |
| JP | 2011038203 | 2/2011 |
| JP | 2013501703 | 1/2013 |
| JP | 2013030469 | 2/2013 |
| KR | 10-2005-0011867 A | 1/2005 |
| KR | 10-0869163 B1 | 11/2008 |
| KR | 10-2010-0053434 | 5/2010 |
| KR | 10-2010-0114401 A | 10/2010 |
| KR | 10-1029147 | 4/2011 |
| KR | 10-1095840 | 12/2011 |
| KR | 10-2012-0000878 A | 1/2012 |
| WO | 2009/063887 | 5/2009 |

* cited by examiner

[FIG. 1]
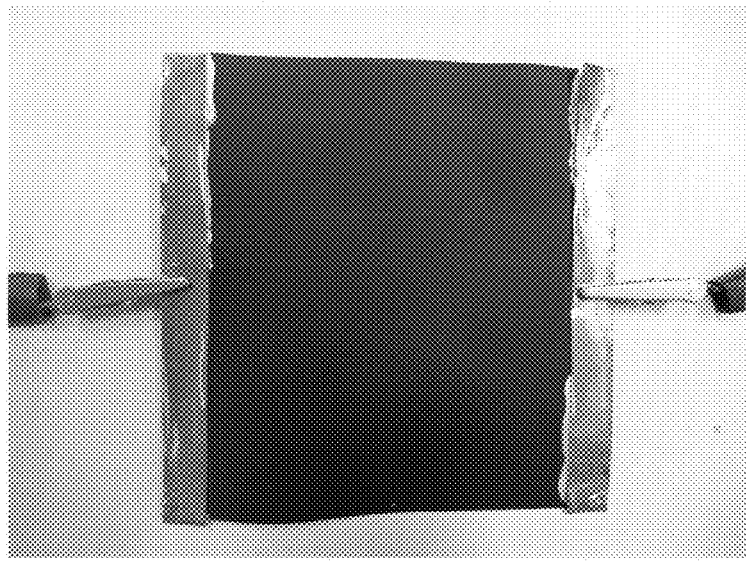
[FIG. 2]
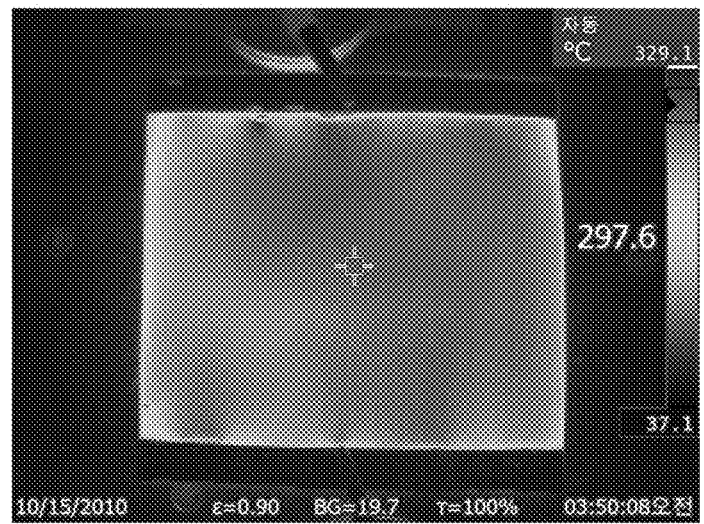

[FIG. 3]
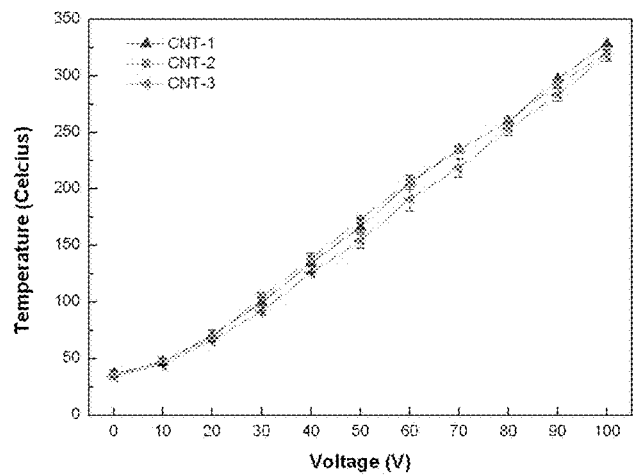
[FIG. 4]
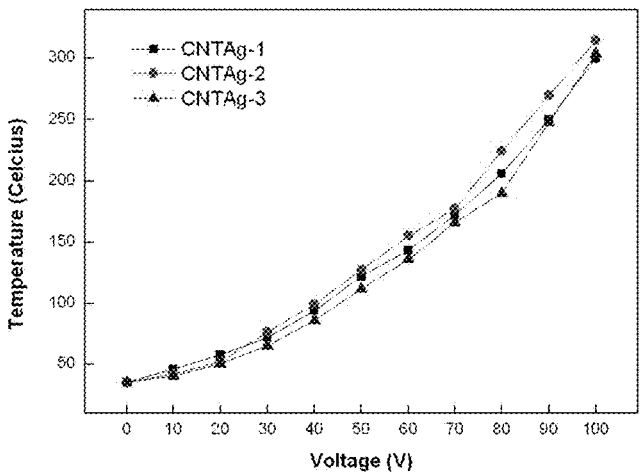

CERAMIC PASTE COMPOSITION USING CARBON NANOTUBE OR CARBON NANOTUBE-METAL COMPLEX, AND CONDUCTIVE FILM CONTAINING SAME

TECHNICAL FIELD

The present invention relates to a ceramic paste composition formed of carbon nanotubes or carbon nanotube-metal composite, and a conductive film including the same, and more particularly, to a silicone binder-based ceramic paste composition in which the paste does not undergo release of an electrode coated in the form of a film or degeneration of a film even at a high temperature of 300° C. or more, and a conductive film including the same.

BACKGROUND ART

As a way to overcome the limitation of thermal resistance and chemical stability of polymer, recently, technical development of a ceramic heat generator of high-performance and new function has been actively conducted. This heat generator is prepared in the form of paste including mainly silver (Ag)-based, palladium (Pd)-based or ruthenium (Ru)-based oxides, and among these, silver itself is difficult to be used as heat generating resistor, since it is a conductive material having low resistance, and has a positive temperature coefficient of resistance. Therefore, in order to compensate for this, palladium and ruthenium are added to the ceramic paste. However, since ruthenium has specific resistance higher than silver, an added amount thereof is eventually larger in order to have a lower resistance value. Further, as the added amount of ruthenium is increased, the resistance of paste itself is increased, and thus, temperature is raised with increasing resistance, and eventually power consumption is increased.

Due to the disadvantages of the metal oxides, a way to use carbon, metal coating powder or a mixture thereof, a carbon nanotube, or the like as alternative materials has been reviewed.

As the related art of carbon materials, there are a heating seat manufactured using a fiber heat generator of carbon materials, such as in Korean Patent Laid-Open Publication No. 10-2012-0000878, a technique to prepare a liquid-phase exothermic composition and coat it to a sheet such as in Korean Patent Registration No. 10-1029147, a heating material further including a heating layer consisting of carbon materials in a base materials such as cotton, non-woven fabric such as in Korean Patent Laid-Open Publication No. 10-2010-0053434, or the like.

Among these, the fiber heat generator has difficulty in being processed in a fibrous form due to low elongation, and has high modulus of elasticity so that it is easily ruptured. Further, in the case that the exothermic composition is prepared and coated on a sheet, or a heating layer is further provided on a base layer, the heat generating layer or coating film is released under a high temperature environment of 300° C. or more, or the coating film is easily broken.

In order to overcome those disadvantages, there is a technique to add a ceramic binder to carbon materials, however, the carbon materials added to a ceramic binder is difficult to be mixed due to high oil absorption and hard workability, and thus, it is almost impossible to add 50 wt % or more of the carbon materials. If the content of the binder is increased in order to compensate for this, physical properties and workability will be improved, but conductivity will be lowered.

Accordingly, there is demand to develop a paste composition having high thermal resistance, while having high heat generating efficiency without changing physical properties by overcoming these disadvantages.

RELATED ART DOCUMENT

Korean Patent Laid-Open Publication No. 10-2012-0000878 (Jan. 4, 2012)

Korean Patent Registration No. 10-1029147 (Apr. 6, 2011)

Korean Patent Laid-Open Publication No. 10-2010-0053434 (May 20, 2010)

DISCLOSURE

Technical Problem

An object of the present invention is to provide a ceramic paste composition using carbon nanotubes or a carbon nanotube-metal composite, without changing physical properties even at high temperature of 300° C. or more, and without undergoing release of a film when manufacturing a conductive film in a form of a coating film, and a conductive film including the same.

Technical Solution

The present invention relates to a ceramic paste composition using carbon nanotubes or a carbon nanotube-metal composite, and a conductive film including the same.

In one general aspect, a ceramic paste composition includes carbon nanotubes or a carbon nanotube-metal composite, and a silicone adhesive, wherein the silicone adhesive contains 0.1 to 10 wt % of a silanol group based on total 100 wt % of the silicone adhesive, and has a mole ratio of a phenyl group to a methyl group of 0.3 to 2.5.

Further, a metal contained in the carbon nanotube-metal composite may be any one or two or more selected from the group consisting of silver, platinum, gold, copper, nickel, iron, cobalt and aluminum, and a content of the metal may be 1 to 80 parts by weight based on 100 parts by weight of the carbon nanotube-metal composite.

Further, the ceramic paste composition may include 20 to 80 wt % of the carbon nanotubes or carbon nanotube-metal composite, and 20 to 80 wt % of the silicone adhesive.

In another general aspect, the ceramic paste composition may further include an organic binder, a dispersant, and an organic solvent. Here, the organic binder may be any one selected from the group consisting of ethyl cellulose, nitrocellulose and a mixture thereof; the dispersant may be any one or two or more selected from the group consisting of a phosphorus ester salt of amino-containing oligomer or polymer, monoester or diester of phosphoric acid, acidic dicarboxylic monoester, a polyurethane-polyamine adduct, and polyalkoxylated monoamine or diamine; and the organic solvent may be any one or two or more selected from the group consisting of acetone, methylethyl ketone, methyl alcohol, ethyl alcohol, isopropyl alcohol, butyl alcohol, ethylene glycol, polyethylene glycol, tetrahydrofuran, dimethyl formamide, dimethyl acetamide, N-methyl-2-pyrrolidone, hexane, cyclohexanone, toluene, chloroform, dichlorobenzene, dimethylbenzene, trimethylbenzene, pyridine, methylnaphthalene, nitromethane, acrylonitrile, octadecylamine, aniline, dimethylsulfoxide, diethyleneglycolethylether and terpineol.

Further, the ceramic paste composition may include 1 to 50 wt % of the carbon nanotube or carbon nanotube-metal composite, 1 to 20 wt % of the organic binder, 1 to 30 wt % of the silicone adhesive, 1 to 20 wt % of the dispersant, and 1 to 90 wt % of the organic solvent.

In another general aspect, a conductive film includes the ceramic paste composition. Here, the conductive film may have a heat generating temperature of 40 to 400° C. with applied voltage of 1.5 to 220 V, when having a thickness of 10 to 600 μm.

Advantageous Effects

The ceramic paste composition according to the present invention is characterized by having low sheet resistance, through which an excellent heat generating property, and shielding, absorbing and conducting properties may be implemented. Further, though the ceramic paste composition has a very high heating temperature of 400° C., as compared with general paste based on carbon nanotubes, the physical properties thereof may be maintained stably, thereby implementing the inherent properties of ceramic paste.

Further, the ceramic paste may be easily prepared as a planar conductive film by a simple process, and widely used in various fields including heat generating products such as those for keeping warmth or heating, and products for electromagnetic wave shielding and absorption, electrodes, electronic circuits, antennas, and the like.

DESCRIPTION OF DRAWINGS

The above and other objects, features and advantages of the present invention will become apparent from the following description of preferred embodiments given in conjunction with the accompanying drawings, in which:

FIG. 1 illustrates a conductive film using the ceramic paste composition according to an exemplary embodiment of the present invention.

FIG. 2 illustrates a heat generating effect when applying voltage of 100 V to the conductive film manufactured according to an exemplary embodiment of the present invention, measured by a thermal imaging camera (Ti32, Fluke).

FIG. 3 illustrates temperature change depending on applied voltage, of the conductive film manufactured in Example 1.

FIG. 4 illustrates temperature change depending on applied voltage over three times, of the conductive film manufactured in Example 2.

BEST MODE

Hereinafter, the ceramic paste composition according to the present invention and a method of preparing the same will be described in detail, through exemplary embodiments or Examples. However, the following exemplary embodiments or Examples are only a reference for describing the present invention in detail, and the present invention is not limited thereto, and may be implemented in various forms.

Further, unless otherwise defined, all technical and scientific terms have the same meaning as commonly understood by one of ordinary skill in the art to which the present invention pertains. The terminology used herein is for the purpose of effectively describing particular embodiments only and is not intended to limit the present invention.

Further, the singular forms used in the specification and claims are intended to include the plural forms as well, unless the context clearly indicates otherwise.

The term 'paste composition' used herein refers to embrace a state of medium hardness between solid and liquid, and for example, may be mixture dough having stickiness or adhesion.

The ceramic paste composition according to an exemplary embodiment of the present invention may include carbon nanotubes (CNTs) or a carbon nanotube-metal composite (CNT-metal nano composite), an organic binder, a silicone adhesive, a dispersant and an organic solvent.

The carbon nanotube in the present invention refers to a composite structure in a cylindrical form in which a layer of graphite is wrapped, and sp2 bonds are formed like graphite, and used as a heat generating and high conductive material in the ceramic paste composition. In particular, the carbon nanotubes or carbon nanotube-metal composite may effectively lower the contact resistance of the ceramic paste composition even with a relatively small amount as compared with a conventional heat generating composition, thereby being effective as a heat generating and high conductive material, and have/has excellent electromagnetic wave shielding and absorption capacity.

The carbon nanotube which may be used in the present invention is not limited by a preparation method, a diameter thereof or the like. The carbon nanotube may be selected from the group consisting of, for example, a single wall CNT, a double wall CNT, a multi wall CNT, or a mixture thereof.

The carbon nanotube-metal composite in the present invention refers to nano composite powder prepared by uniformly mixing the carbon nanotubes and metal ions in a molecular level process, and the carbon nanotube-metal composite which may be used in the present invention is not limited by a preparation method or a shape such as a diameter thereof.

Particularly, the carbon nanotube-metal composite may effectively lower the contact resistance of the ceramic paste composition even with a relatively small amount, and thus, is effective as a heat generating and high conductive material, and has excellent electromagnetic wave shielding and absorption capacity, through which a larger area may be implemented. For a specific synthesis process of the carbon nanotube-metal composite, Korean Patent Registration No. 10-1095840 and others may be referred.

In the carbon nanotube-metal composite, the metal may be any one selected from the group consisting of gold (Au), platinum (Pt), silver (Ag), copper (Cu), nickel (Ni), iron (Fe), cobalt (Co) and aluminum (Al) or a mixture thereof, and a compound including those metals except metal ions may be also used. As the metal, it is preferred to use silver or platinum.

In the carbon nanotube-metal composite, it is preferred that the content of the metal is 1 to 80 parts by weight, based on 100 parts by weight of the carbon nanotube-metal composite, and 20 to 60 parts by weight is preferable for excellent conductivity, and may prevent the conductivity from being excessively increased or decreased.

The silicone adhesive serves as a dispersant for facilitating dispersion of the carbon nanotubes or carbon nanotube-metal composite, and may further serve as a viscosifier for stabilizing a ceramic paste mixed solution to be prepared.

Usually as an adhesive used with the carbon nanotube or carbon nanotube-metal composite, the adhesive including N, O, S or other functional groups having lone pair electrons so that a good coordination bond is provided for stabilization of the carbon nanotube or carbon nanotube-metal composite during processing (coating or thin film forming of) the prepared paste composition has been used. In particular, a polymer binder having high oxygen content such as a hydroxyl group and a carboxyl group has been used, and the adhesive includes for example, an epoxy resin, a phenol resin, a urethane resin, a polyester resin, a polyvinylchloride resin, a urea resin, a polyethylene resin, an acryl resin, and the like. These polymers have strong affinity to the surface of the carbon nanotube or carbon nanotube-metal composite, and may increase dispersibility and stability. However, these resins may not satisfy thermal resistance required in the present invention, it is preferred to use a silicone-based adhesive.

The silicone adhesive according to the present invention is a polymer having a polysiloxane main chain alternating a silicon (Si) atom and an oxygen (O) atom. Generally silicone has a structure in which each silicon atom is bonded to two organic atomic groups of alkyl such as methyl, ethyl or propyl, or phenyl ($-C_6H_5$), and the silicone adhesive according to the present invention may have hydrogen, a hydroxyl group, a methyl group or a phenyl group bonded to a polysiloxane main chain. Here, it is preferred that the content of the polysiloxane main chain, that is, $SiO_2$ is 45 to 65 wt %, preferably 47 to 63 wt %, based on 100 wt % of the total silicone adhesive.

It is preferred that the silicone adhesive has a certain range of a content of silanol having a hydroxyl group as a functional group for improved dryness and also excellent flexibility, and the silanol content is preferably 0.1 to 10 wt %, more preferably 1 to 6 wt %, based on 100 wt % of the total silicone adhesive. When the silanol content is less than 0.1 wt %, the dryness and strength may be lowered, and when more than 10 wt %, the flexibility and processability may be deteriorated.

It is preferred that the silicone adhesive according to the present invention has a constant ratio of a methyl group and a phenyl group for more improved thermal stability of the prepared ceramic paste composition. As to the ratio between the methyl group and the phenyl group, it is preferred that a ratio of 0.3 to 2.5 mol of the phenyl group to 1 mol of the methyl group, preferably a ratio of 0.4 to 2.0 mol of the phenyl group to 1 mol of the methyl group. When the phenyl group has a mole ratio less than 0.3, mechanical strength and thermal resistance are lowered, and when the phenyl group has a mole ratio more than 2.5, water repellency is deteriorated, and elasticity is increased, thereby lowering processability.

The silicone adhesive according to the present invention may be cured by bonds between functional groups, and as a preferred curing form, the silicone adhesive having a degree of crosslinking of 55 to 80%, and a weight average molecular weight of 1,000 to 400,000 is preferred in terms of processability and mechanical physical properties.

As the silicone adhesive, for example, any one or a mixture thereof selected from the group consisting of a liquid resin such as RSN-0409 HS, RSN-0431 HS, RSN-0804, RSN-0805, RSN-0806, RSN-0808 and RSN-0840, or a solid resin such as RSN-0217, RSN-0220, RSN-0233 and RSN-0249 which are silicone resins from Dow Corning (XIAMETER®) may be freely selected according to a final applied temperature and hardness of a coating film, and used.

It is preferred that the ceramic paste composition according to the present invention includes 20 to 80 wt % of the carbon nanotube or carbon nanotube-metal composite, and 20 to 80 wt % of the silicone adhesive, since it may allow effective dispersion of the carbon nanotube or carbon nanotube-metal composite, thereby expressing sufficient heat generating, electromagnetic wave shielding, and conducting properties which are desired in the present invention.

Further, the paste composition according to the present invention may further include an organic binder, a dispersant, and an organic solvent, if necessary. It is possible to add only any one of the organic binder, dispersant, and organic solvent, however, it is also possible to add two or more thereof, if necessary, and most preferably, all of the organic binder, dispersant, and organic solvent may be added.

As described above, when the paste composition includes all of the organic binder, dispersant, and organic solvent, it is preferred that the compositional ratios of the paste composition are 1 to 50 wt % of the carbon nanotube or carbon nanotube-metal composite, 1 to 20 wt % of the organic binder, 1 to 30 wt % of the silicone adhesive, 1 to 20 wt % of the dispersant, and 1 to 90 wt % of the organic solvent.

The organic binder may serve to improve the processability, the coatability when coating or thin film processing, or the adhesion to a substrate, of the ceramic paste composition prepared according to the present invention.

The kind of organic binder is not particularly limited, and it is preferred to use a cellulose derivative. In the cellulose derivative, some or all of three hydroxyl groups present in β-glucose which is a cellulose repeating unit are substituted, and any one or a mixture thereof selected from for example, ethyl cellulose, nitrocellulose and the like may be used.

It is preferred that the organic binder has a certain range of viscosity, though it is not limited by a preparation method thereof. It is preferred that the organic binder has viscosity of 10 to 50,000 centipoise (cps), preferably 1,000 to 35,000 cps at 25° C. When the viscosity is out of the range, a tissue may not be densely formed when processing the composition, cracks may occur, or storage stability may be deteriorated.

It is preferred that the organic binder is included at 1 to 20 wt %, preferably 3 to 15 parts by weight, based on 100 wt % of the ceramic paste composition, for maintaining processability of the composition, and mechanical physical properties of a thin film and coating without deterioration.

The dispersant is a composition, when preparing ceramic paste, maintaining fine particles through three-dimensional stabilization of the carbon nanotubes or carbon nanotube-metal composite, and improving dispersibility, thereby allowing the same sheet resistance value when coating a surface. However, since the dispersant does not serve as a binder, if it is added too much, it will interrupt curing. Further, if it has a too high molecular weight, it is difficult to obtain compatibility with a binder, and thus, a compound having a number average molecular weight of 2,000 to 20,000 is preferred.

The dispersant according to the present invention may be obtained by salifying an amine functional compound using an acid, and as the amine functional compound, the compounds described in Korean Patent Laid-Open Publication No. 10-2011-0099679 are preferred.

The dispersants obtained by salifying the amine functional compound may be any one or two or more selected from the group consisting of for example, (a) a phosphorus ester salt of an amino-containing oligomer or polymer such as a phosphorus ester salt of polyamine optionally modified into aliphatic acid or alkoxylated (more specifically ethoxylated), a phosphorus ester salt of an epoxy-polyamine adduct, a phosphorus ester salt of an amino-containing acrylate or methacrylate copolymer, and a phosphorus ester salt of an acrylate-polyamine adduct, b) monoester or diester of phosphoric acid such as monoester or diester of phosphoric acid containing alkyl, aryl, aralkyl or alkylaryl alkoxylate (for example, nonylphenol ethoxylate, isotridecyl alcohol ethoxylate or alkylene oxide polyether prepared from butanol), and monoester or diester of phosphoric acid containing polyester (for example, lactone polyester, e.g., caprolactone polyester or mixed type caprolactone/valerolactone polyester), (c) acidic dicarboxylic monoester exemplified by acidic dicarboxylic monoester (more specifically succinic, maleic or phthalic monoester) containing alkyl, aryl, aralkyl or alkylaryl alkoxylate (for example, nonylphenol ethoxylate, isotridecyl alcohol ethoxylate or alkylene oxide polyether prepared from butanol), (d) a poly-urethane-polyamine adduct, (e) polyalkoxylated monoamine or diamine (for example, ethoxylated oleylamine or alkoxylated ethylene diamine), and (f) monoamine, diamine and polyamine, amino alcohol and unsaturated 1,2-dicarboxylic acid, and anhydrides thereof, a reaction product of a salt thereof and unsaturated aliphatic acid, and a reaction product of alcohol and/or amine and unsaturated aliphatic acid.

The dispersant of such kind may be, for example, the products of trade names, BYK-220 S, BYK-9076, BYK-9077, BYK-P 104, BYK-P 104 S, BYK-P 105, BYK-W 9010, BYK-W 920, BYK-W 935, BYK-W 940, BYK-W 960, BYK-W965, BYK-W 966, BYK-W 975, BYK-W 980, BYK-W 990, BYK-W 995, BYK-W 996, BYKUMEN, LACTIMON, ANTI-TERRA-202, ANTI-TERRA-203, ANTI-TERRA-204, ANTI-TERRA-205, ANTI-TERRA-206, ANTI-TERRA-207, ANTI-TERRA-U 100, ANTI-TERRA-U 80, ANTI-TERRA-U, DISPERBYK, DISPERBYK-101, DISPERBYK-102, DISPERBYK-103, DISPERBYK-106, DISPERBYK-107, DISPERBYK-108, DISPERBYK-109, DISPERBYK-110, DISPERBYK-111, DISPERBYK-112, DISPERBYK-115, DISPERBYK-116, DISPERBYK-130, DISPERBYK-140, DISPERBYK-142, DISPERBYK-145, DISPERBYK-160, DISPERBYK-161, DISPERBYK-162, DISPERBYK-163, DISPERBYK-164, DISPERBYK-165, DISPERBYK-166, DISPERBYK-167, DISPERBYK-168, DISPERBYK-169, DISPERBYK-170, DISPERBYK-171, DISPERBYK-174, DISPERBYK-176, DISPERBYK-180, DISPERBYK-181, DISPERBYK-182, DISPERBYK-183, DISPERBYK-184, DISPERBYK-185, DISPERBYK-187, DISPERBYK-190, DISPERBYK-191, DISPERBYK-192, DISPERBYK-193, DISPERBYK-194, DISPERBYK-2000, DISPERBYK-2001, DISPERBYK-2009, DISPERBYK-2010, DISPERBYK-2020, DISPERBYK-2025, DISPERBYK-2050, DISPERBYK-2070, DISPERBYK-2090, DISPERBYK-2091, DISPERBYK-2095, DISPERBYK-2096, DISPERBYK-2150, DISPERBYK-2155, DISPERBYK-2163, DISPERBYK-2164, DISPERPLAST-1010, DISPERPLAST-1011, DISPERPLAST-1012, DISPERPLAST-1018, DISPERPLAST-I, or DISPERPLAST-P, produced by BYK-CHEMIE GMBH (Wesel), and among these, it is preferred to use any one or a mixture thereof selected from the group consisting of DISPERBYK-180, DISPERBYK-182, DISPERBYK-184 and the like which are a high molecular weight wetting dispersant for oil-soluble coatings and water-based coatings, and DISPERBYK-190, DISPERBYK-191, DISPERBYK-192, DISPERBYK-194 and the like which are a wetting dispersant for water-based coatings and a high concentration coloring agent.

The dispersant may be preferably included at 1 to 20 wt %, based on 100 wt % of the ceramic paste composition, and 2 to 10 wt % is more preferred for an excellent dispersion effect even with addition of a small amount, and uninterrupted curing.

The organic solvent is not particularly limited, if it is commonly used in the art, and may be for example, any one or a mixture thereof selected from the group consisting of acetone, methylethylketone, methyl alcohol, ethyl alcohol, isopropyl alcohol, butyl alcohol, ethyleneglycol, polyethyleneglycol, tetrahydrofuran, dimethylformamide, dimethylacetamide, N-methyl-2-pyrrolidone, hexane, cyclohexanone, toluene, chloroform, dichlorobenzene, dimethylbenzene, trimethylbenzene, pyridine, methylnaphthalene, nitromethane, acrylonitrile, octadecylamine, aniline, dimethylsulfoxide, diethyleneglycolethylether, terpineol and the like, and preferably, when a solvent having a high volatilization temperature such as terpineol is used, it is easy to prepare the paste composition, due to low volatility of the solvent, and compatibility is high as a commonly used solvent.

It is preferred that the content of the organic solvent is 1 to 90 wt %, preferably 40 to 80 wt %, based on 100 wt % of the total silicone paste composition, for preventing electrical properties from being deteriorated when film forming or preparing of a coating film, and simultaneously a coating film or thin film to be formed from being released.

The ceramic paste composition according to the present invention may be prepared by producing a mixed solution including 1 to 50 wt % of the carbon nanotube or carbon nanotube-metal composite, 1 to 20 wt % of the organic binder, 1 to 30 wt % of the silicone adhesive, 1 to 20 wt % of the dispersant, and 1 to 90 wt % of the organic solvent, and dispersing the mixed solution.

By way of example, the ceramic paste composition according to the present invention may be prepared by including:

producing a mixed solution including carbon nanotubes, a silicone adhesive, an organic binder, a dispersant, and an organic solvent; and dispersing the thus-produced mixed solution, or by including:

producing a mixed solution including a carbon nanotube-metal composite, a silicone adhesive, an organic binder, a dispersant, and an organic solvent; and dispersing the thus-produced mixed solution.

The step of dispersing the mixed solution may be carried out by applying various methods generally used in the art. The method may be, for example, any one selected from the group consisting of those using ultra-sonication, a homomixer, a roll-mill, a ball-mill, an attrition mill, a vertical-mill or a horizontal-mill. By way of example, the step of dispersing the mixed solution in the present invention may include performing a 3-roll mill method five times.

The ceramic paste composition according to the present invention is not limited by an application method and a form thereof. For example, a planar conductive film may be manufactured by a method of coating on a base layer, through which heat generating, shielding, absorption and conducting properties may be expressed.

The coating process may be carried out by a method commonly known in the art, for example, a method such as screen-printing, doctor blade, bar-coating, spin-coating, dip-coating, spray-coating, eletrophoretic deposition, offset-printing, vacuum filtration or normal casting may be applied, but not limited thereto.

As the base layer, a substrate for a display or printed circuit commonly used in the art and the like may be used, and for example, polycarbonate, polyethylene terephthalate, polyamide, cellulose ester, regenerated cellulose, polypropylene, polyacrylonitrile, polysulfone, polyester sulfone, polyvinylidene fluoride, glass or the like may be used. However, the base layer may be freely selected according to a product use and an application use, and the present invention is not limited to the examples listed above.

A conductive film manufactured by the ceramic paste composition according to the present invention may be varied depending on a manufacture condition, or a size, shape or thickness of the film, however, have sheet resistance in a range of 0.1 to 1,000 ohm/sq, preferably 1 to 300 ohm/sq, more preferably 1 to 150 ohm/sq. The conductive film according to the present invention has low sheet resistance, through which it has excellent heat generating, shielding and absorption properties and the like. However, if the sheet resistance is too low, a heat generating property may be significantly declined, and thus, the film having the sheet resistance in the above range may implement a high heat generating property with relatively low electric power consumption.

If the conductive film according to the present invention is used in electronic products such as an electrode, applied voltage may be in a range of 1.5 to 220 V, preferably 10 to 220 V, more preferably 10 to 100 V, when the conductive film has a thickness of 10 to 600 μm. Within the above range, sufficient heat generation drive may be derived, and simultaneously burn, fire and product damage due to heat generation may be prevented.

Further, the ceramic paste composition according to the present invention may have a heat generating temperature of 40 to 400° C., when applying the voltage in the above range to that having a thickness in the above range. The heat generating temperature may be varied with the applied voltage, and by way of example, when the applied voltage to the paste composition according to the present invention is in a range of 90 to 100 V, the heat generating temperature may be in a range of 297 to 328° C.

However, the ceramic paste composition according to the present invention may have problems in that when the heat generating temperature is above 400° C., oxidation of carbon nanotubes occurs, a release phenomenon that a polymer base layer is burned so that a coating film is peeled off occurs, or inherent properties of the paste composition are not implemented due to decomposition of the binder.

A conductive film manufactured by the ceramic paste composition according to the present invention may be included in a heat generating product, an electromagnetic wave shielding and absorption product, and a conductive product. The heat generating product may be used in keeping warmth, heating or the like, and commercialized in various forms, and by way of example, may be used as a heat generating sheet, a heat generating pipe, a heat generating thermos, a heat generating radiator, or the like. Further, the electromagnetic wave shielding and absorption product may be used in, for example, all electronic products emitting electromagnetic waves such as a cellular phone, a television and a vehicle, and various products requiring high conductivity such as a binder for an electrode, an electronic circuit and an antenna.

Hereinafter, the ceramic paste composition according to the present invention and a method of preparing the same will be described in detail, by the following Examples and Comparative Examples.

The physical properties of the ceramic paste composition prepared in the following Examples and Comparative Examples were measured as follows:

(Temperature Change)

In order to compare temperature change depending on applied voltage, both ends of the coating film prepared in the following Examples and Comparative Examples were coated with silver paste, and overlaid with copper foil, thereby forming electrodes. Thereafter, voltage was applied at an interval of 10 V from 0 V to 100 V, and a heat generating temperature therefor was measured.

(Electrical Conductivity)

In order to compare electrical conductivity, the sheet resistance of the coating films prepared in the following Examples and Comparative Examples was measured using a surface resistance measurement system (Loresta-GP. MCP-T610, Mitsubishi Chemical Analytech). The coating film was divided into 4 parts when measuring the sheet resistance of the coating film with the surface resistance measurement system, and the average value thereof was taken.

(Release)

In order to determine whether the coating film is released, Scotch magic tape from 3M was attached to and then detached from the surface of the coating film prepared in the following Examples and Comparative Examples, and the release was determined by checking whether the tape is smeared with the coating film. It was indicated as x when the film was not released, Δ when the film was not released, but deformed, and ○ when the film was released.

Example 1

1.5 g of carbon nanotubes (Hanwha Nanotech Corporation) were added to a 500 ml Erlenmeyer flask, and 33.75 g of terpineol (α-terpineol, Sigma-Aldrich) as an organic solvent, 1.25 g of ethyl cellulose (Sigma-Aldrich), 5 g of a silicone adhesive (RSN-0806, Dow Corning), and 0.75 g of a dispersant (DISPERBYK-192, BYK) were added thereto. The Erlenmeyer flask was mounted on an agitator to be stirred for 60 minutes, and subjected to dispersion five times using a 3-roll mill (EXAKT 50), thereby preparing a ceramic paste composition.

Separately, 10 ml of the ceramic paste composition was placed on the surface of the polyimide film of 100 mm×100 mm, and coating was carried out using a bar coater. The coating was carried out three times, and an average thickness of the coating film was 100 μm per one process. The thus-produced coating film was heated to 300° C. at a heating rate of 2° C./min, and then subjected to heat treatment at 300° C. for 30 minutes, thereby manufacturing a coating film. The temperature change, electrical conductivity, and release of the thus-manufactured coating film were measured, and are shown in Table 1.

Example 2

A coating film was manufactured in the same manner as in Example 1, except that 5 g of a carbon nanotube-silver nano composite (Hanwha Nanotech Corporation) was added instead of the carbon nanotubes. The temperature change, electrical conductivity, electromagnetic wave shielding, and release of the thus-manufactured coating film were measured, and are shown in Table 1.

Comparative Example 1

A coating film was manufactured in the same manner as in Example 1, except that the same amount of methyl methacrylate (Daekwang Highpolymer Co., Ltd.) was added instead of the silicone adhesive. The temperature change, electrical conductivity, electromagnetic wave shielding, and release of the thus-manufactured coating film were measured, and are shown in Table 1.

TABLE 1

|  |  | Example | | Comparative Example |
|---|---|---|---|---|
|  |  | 1 | 2 | 1 |
| Temperature change | 0 V | 25.0 | 25.0 | 25.0 |
|  | 10 V | 45.5 | 44.7 | 39.3 |
|  | 20 V | 68.6 | 55.0 | 51.2 |
|  | 30 V | 98.0 | 79.0 | 71.7 |
|  | 40 V | 132.5 | 102.6 | 96.5 |
|  | 50 V | 164.8 | 130.5 | — |
|  | 60 V | 207.5 | 158.4 | — |
|  | 70 V | 235.4 | 180.3 | — |
|  | 80 V | 260.4 | 227.0 | — |
|  | 90 V | 297.4 | 275.5 | — |
|  | 100 V | 328.4 | 317.1 | — |
| Release |  | x | x | o |

As shown in above Table 1, and FIGS. 3 and 4, it is recognized that the heat generating coating film manufactured according to the present invention has a heat generating temperature raised in proportion to applied voltage, and in Comparative Example 1 using another adhesive or a silicone adhesive having different physical properties, temperature exceeds the thermal resistant temperature at a certain voltage or more, and thus, it was impossible to measure the temperature change. Further, it was confirmed that though repetitive experiments were carried out under the same condition in order to confirm thermal durability, heat generation was all similar. In addition, it was confirmed that though high temperature according to heat generation was continuously maintained, the heat generating coating film manufactured in the Examples was stably maintained without being released.

The invention claimed is:

1. A ceramic paste composition, comprising, based on 100 wt % of the ceramic paste composition:
   1 to 50 wt % of carbon nanotubes or a carbon nanotube-metal composite;
   1 to 30 wt % of a silicone adhesive, wherein the silicone adhesive comprises 0.1 to 10 wt % of a silanol group, based on 100 wt % of the silicone adhesive, and wherein a molar ratio of a phenyl group to a methyl group present in the silicone adhesive ranges from 0.3:1 to 2.5:1;
   3 to 15 wt % of an organic binder, wherein a viscosity of the organic binder ranges from 10 cps to 50000 cps at 25° C.;
   2 to 10 wt % of a dispersant, wherein a number average molecular weight of the dispersant ranges from 2000 to 20000; and
   40 to 80 wt % of an organic solvent.

2. The ceramic paste composition of claim 1, wherein a metal contained in the carbon nanotube-metal composite is one or more selected from the group consisting of silver, platinum, gold, copper, nickel, iron, cobalt and aluminum.

3. The ceramic paste composition of claim 2, wherein a content of the metal is 1 to 80 parts by weight, based on 100 parts by weight of the carbon nanotube-metal composite.

4. The ceramic paste composition of claim 1, wherein
   the organic binder is any one selected from the group consisting of ethyl cellulose, nitrocellulose and a mixture thereof;
   the dispersant is any one or more selected from the group consisting of a phosphorus ester salt of amino-containing oligomer or polymer, monoester or diester of phosphoric acid, acidic dicarboxylic monoester, a polyurethane-polyamine adduct, and polyalkoxylated monoamine or diamine; and
   the organic solvent is any one or more selected from the group consisting of acetone, methylethyl ketone, methyl alcohol, ethyl alcohol, isopropyl alcohol, butyl alcohol, ethylene glycol, polyethylene glycol, tetrahydrofuran, dimethyl formamide, dimethyl acetamide, N-methyl-2-pyrrolidone, hexane, cyclohexanone, toluene, chloroform, dichlorobenzene, dimethylbenzene, trimethylbenzene, pyridine, methylnaphthalene, nitromethane, acrylonitrile, octadecylamine, aniline, dimethylsulfoxide, diethyleneglycolethylether and terpineol.

5. A conductive film comprising the ceramic paste composition of claim 1.

6. The conductive film of claim 5, wherein the conductive film has a heat generating temperature of 40 to 400° C. with applied voltage of 1.5 to 220 V, when having a thickness of 10 to 600 μm.

* * * * *